US011136031B2

(12) United States Patent
Rabbiosi et al.

(10) Patent No.: US 11,136,031 B2
(45) Date of Patent: Oct. 5, 2021

(54) MOTOR-DRIVEN TRAILER AND A METHOD FOR CONTROLLING A MOTOR-DRIVEN TRAILER

(71) Applicant: NÜWIEL GmbH, Hamburg (DE)

(72) Inventors: Sandro Rabbiosi, Hamburg (DE); Fahad Aman Khan, Hamburg (DE); Natalia Tomiyama, Hamburg (DE)

(73) Assignee: Nuewiel GmbH, Hamburg (DE)

( * ) Notice: Subject to any disclaimer, the term of this patent is extended or adjusted under 35 U.S.C. 154(b) by 107 days.

(21) Appl. No.: 15/999,679

(22) PCT Filed: Feb. 13, 2017

(86) PCT No.: PCT/EP2017/053166
§ 371 (c)(1),
(2) Date: Aug. 17, 2018

(87) PCT Pub. No.: WO2017/140626
PCT Pub. Date: Aug. 24, 2017

(65) Prior Publication Data

US 2020/0377094 A1 Dec. 3, 2020

(30) Foreign Application Priority Data

Feb. 18, 2016 (DE) ......................... 102016102847.9

(51) Int. Cl.
*B60W 30/18* (2012.01)
*B60W 10/08* (2006.01)
(Continued)

(52) U.S. Cl.
CPC ...... *B60W 30/18009* (2013.01); *B60W 10/08* (2013.01); *B60W 10/18* (2013.01);
(Continued)

(58) Field of Classification Search
CPC .............................................. B60W 30/18009
See application file for complete search history.

(56) References Cited

U.S. PATENT DOCUMENTS 6,516,925 B1 * 2/2003 Napier ...................... B60T 1/10 188/112 A
6,982,635 B2 * 1/2006 Obradovich ......... B62D 15/025 340/439

(Continued)

FOREIGN PATENT DOCUMENTS

| | | |
|---|---|---|
| DE | 102006009862 A1 | 9/2007 |
| DE | 102010042907 A1 | 4/2012 |
| DE | 102010051838 A1 | 5/2012 |

OTHER PUBLICATIONS

PCT/EP2017/053166; International Filing Date Feb. 13, 2017; International Preliminary Report on Patentability; dated Aug. 23, 2018; 5 pages.

(Continued)

*Primary Examiner* — Alex C Dunn
(74) *Attorney, Agent, or Firm* — Barclay Damon LLP

(57) ABSTRACT

A method for controlling a trailer driven by an electric motor comprises defining a distance between the trailer and a towing vehicle as a neutral position and determining an actual distance between the trailer and the towing vehicle. A deviation between the actual distance and the neutral position is determined and output as a distance value. The braking of the trailer is electrically-actuated when the actual distance is decreased relative to the neutral position by at least a first distance value. The braking of the trailer is mechanically-actuated when the actual distance is decreased relative to the neutral position by at least a second distance value, wherein the second distance value is greater than the first distance value. The trailer is accelerated by the electric (Continued)

motor when the actual distance is increased relative to the neutral position by a third distance value.

19 Claims, 12 Drawing Sheets

(51) Int. Cl.
*B60W 10/18* (2012.01)
*B62D 59/04* (2006.01)

(52) U.S. Cl.
CPC ......... *B62D 59/04* (2013.01); *B60W 2300/14* (2013.01); *B60W 2554/80* (2020.02)

(56) References Cited

U.S. PATENT DOCUMENTS 7,957,875 B2 * 6/2011 Antanaitis ............... B60L 58/40 701/70
8,311,693 B2 * 11/2012 Wu ..................... B60T 8/17555 701/22
8,365,849 B2 * 2/2013 Bartel ..................... B60T 8/248 180/14.2
8,700,284 B2 * 4/2014 Wojtkowicz .............. H02J 7/14 701/70
8,746,812 B2 * 6/2014 Albright ................... B60T 7/20 303/123
8,838,353 B2 * 9/2014 Wu ......................... B60T 8/248 701/70
9,663,079 B2 * 5/2017 Yamamoto .............. B60T 7/085
2005/0151420 A1 * 7/2005 Crombez .................. B60T 1/10 303/152
2006/0206253 A1 * 9/2006 Yu .......................... B62D 6/002 701/70
2007/0138784 A1 * 6/2007 Jager ......................... B60P 1/26 280/839
2008/0036230 A1 * 2/2008 Dutton ................. B60Q 1/2665 296/1.11
2012/0037435 A1 2/2012 Duehring
2013/0311058 A1 * 11/2013 Wojtkowicz .......... H02J 7/1461 701/70
2016/0325748 A1 * 11/2016 Mori ..................... B60W 10/08

OTHER PUBLICATIONS

PCT/EP2017/053166; International Filing Date Feb. 13, 2017; International Search Report and Written Opinion; dated Jun. 12, 2017; 4 pages.

* cited by examiner 102
101
215
213
211
216
208
230
220
203
Fig. 6.1
Fig. 6.2
Fig. 6.3
Fig. 6.4

MOTOR-DRIVEN TRAILER AND A METHOD FOR CONTROLLING A MOTOR-DRIVEN TRAILER

CROSS REFERENCE TO RELATED INVENTION

This application is a national stage application pursuant to 35 U.S.C. § 371, International Application No. PCT/EP2017/053166, filed Feb. 13, 2017, which claims priority to, and benefit of, German Patent Application No. 10 2016 102 847.9 filed on Feb. 18, 2016. The entire contents of such applications are hereby incorporated by reference.

BACKGROUND

The present invention relates to a method for controlling a trailer driven by an electric motor, as well as such a motor-driven trailer.

Prior art trailers are based on force measuring sensors, in particular strain gauges, that measure forces arising between the trailer and the towing vehicle. As is known, these force measuring sensors are sensitive to external influences, in particular to environmental influences such as temperature and moisture fluctuations. Moreover, the connection between the trailer and towing vehicle according to the prior art is always rigid and hence sensitive to axial as well as lateral forces between the trailer and towing vehicle. In particular, strong vibrations up to resonant oscillations can arise in the trailer/towing vehicle system. Consequently, the force measuring sensor generates a plurality of measured data which in turn leads to a major evaluation effort for the control unit. It is also difficult to differentiate the measured data essential to control the trailer from the background noise generated by the vibrations and other disturbance variables. Among other things, this impairs driving comfort and increases energy consumption.

A motor-driven trailer for a bicycle is known from US 2012/0037435 A1. The trailer described therein is connected by a pull rod to the bicycle, wherein the pull rod possesses a dynamometer and the trailer has a motor. Depending on the difference in speed between the bicycle and the trailer, the dynamometer measures a compressive force when the trailer is faster than the bicycle or a tractive force when the trailer lags behind the bicycle. The motor accelerates the trailer corresponding to the forces measured by the force measuring sensor.

U.S. Pat. No. 8,365,849 B2 describes a system for towing a trailer. The trailer comprises an electric motor, brakes, a pull rod as well as a force measuring sensor arranged on the pull rod. Depending on the mechanical forces measured by the dynamometer, the trailer is accelerated by the motor or braked by the brakes.

DE 10 2010 051 838 A1 describes a trailer for a bicycle, wherein the trailer comprises an electric machine that can act both as a brake as well as a motor in order to prevent the trailer from having a noticeable retroactive effect on the bicycle when pushing or braking the bicycle. To achieve this, various sensors are described. Accordingly, a pedal pressure sensor, a braking force sensor provided in the brake lever, as well as a force measuring sensor provided in the connection between the bicycle and trailer are proposed. The signals from these sensors are transmitted to an electronic logic circuit that in turn controls the electric machine and/or the brakes. By means of the force measuring sensor, it can be determined if the bicycle exerts a tractive force or pressure on the trailer, wherein the motor, or respectively brakes are controlled depending on the measured signals in order for the trailer to track with the bicycle. Alternatively to measuring force, pretensioned measuring systems are proposed, wherein either a pressure sensor records the change in pressure in a cylinder, or a position sensor measures the position of a disk mounted on springs. Such pretensioned measuring systems do in fact have a less rigid coupling between the trailer and bicycle; however, disturbing, in particular pulsating feedback effects still remain in this case as well.

DE 10 2006 009 862 A1 describes a bicycle pusher trailer for driving and braking a bicycle, wherein a battery is mounted as an inertial mass in a frame of the trailer so that the battery swings forward during a braking movement and swings backward during an acceleration movement. The battery is articulated via a control lever to an actual position value sensor and a Bowden cable. During a braking process, an electric motor is recuperatively operated by the actual position value sensor, while a mechanical brake is simultaneously activated by the Bowden cable.

BRIEF SUMMARY OF THE INVENTION

The underlying object of the invention is therefore to configure the towing of a trailer by a towing vehicle as simply and reliably as possible, to minimize energy consumption and to increase driving comfort.

A method for controlling a trailer driven by an electric motor comprises defining a distance between the trailer and towing vehicle as a neutral position and measuring a deviation of the distance between the trailer and towing vehicle from the neutral position and outputting this deviation as a distance value. Electrically-actuating braking of the trailer when the distance between the trailer and towing vehicle has decreased relative to the neutral position by at least one first distance value. Mechanically-actuating braking of the trailer when the distance between the trailer and towing vehicle has decreased relative to the neutral position by at least one second distance value, wherein the second distance value is greater than the first distance value and accelerating the trailer by means of the electric motor when the distance between the trailer and towing vehicle has increased relative to the neutral position by a third distance value.

According to the disclosed method, a distance between the towing vehicle and trailer is defined as a neutral position. The distance between the trailer and the towing vehicle is then monitored continuously or at definable intervals in time in driving mode, and a deviation in the distance between the trailer and towing vehicle from the neutral position is measured and output as a distance value. Depending on the deviation that is measured and output as a distance value, the trailer is either braked or accelerated. The braking is actuated electrically and/or mechanically. If the distance between the trailer and towing vehicle decreases for example through a reduction in speed of the towing vehicle, the trailer is braked by an electrically triggered brake as long as the distance between the trailer and towing vehicle is reduced by at least one first distance value, however by less than a second distance value. The first and second distance value are freely selectable; however, the second distance value is greater than the first distance value. When the distance between the trailer and towing vehicle is reduced enough for the second distance value to also be reached or exceeded, the trailer is braked by a mechanically triggered brake (overrun braking). If the distance between the towing vehicle and trailer increases relative to the neutral position by at least one third distance value, the electric motor then accelerates the trailer. An increase in the distance between the towing vehicle and trailer can for example arise when the towing vehicle accelerates or travels up a slope. The distance between the trailer and towing vehicle is a distance along the axis of travel of the towing vehicle, i.e., an axial distance between a towing vehicle axis and a trailer axis.

The trailer reacts to the movement of the towing vehicle by the electrically and/or mechanically-actuated braking of the trailer and the acceleration of the trailer depending on the deviation in distance between the trailer and towing vehicle relative to the previously defined neutral position. Accordingly, the neutral position is established as a reference point at which the system consisting of the trailer and towing vehicle is regulated. The mechanically-actuated brake allows a safe braking of the trailer even in the event of a failure or malfunction of electrical brake actuation. The mechanically-actuated braking can however in principle also be a hydraulically or pneumatically-actuated braking. The independence of the mechanically/hydraulically/pneumatically-actuated braking from the electrically-actuated braking is essential. Force measuring sensors can be omitted with the method according to the invention. Instead, the distance between the trailer and towing vehicle is measured and regulated by a distance measurement.

According to one embodiment, the electrically-actuated braking of the trailer can be a regenerative braking. In particular, the regenerative braking can be achieved by the electric motor. The electric motor can be operated generatively to accomplish this. According to one embodiment, the electrically-actuated braking of the trailer can also be a soft, direct braking, and the mechanically-actuated braking of the trailer can be a hard, direct braking, wherein the hard, direct braking exhibits a stronger increase in the braking force depending on the axial deviation in distance between the trailer and towing vehicle than the soft, direct braking. Soft braking therefore means applying less braking force than with hard braking. In particular, soft and hard direct braking can occur by means of a direct brake. The term “direct braking” and “direct brake” was selected in the present case to distinguish from regenerative braking by the electric motor and is not to be understood as a restriction of the brake design. After the first distance value is exceeded, braking is electrically triggered which can regeneratively brake the trailer on the one hand via the electric motor or on the other hand can softly directly brake the trailer via the direct brake. Braking can also be simultaneously regenerative and softly direct. Regenerative braking can also be soft. If the reduced distance between the towing vehicle and trailer reaches a second distance value, direct braking is triggered mechanically. The braking is hard, i.e., with a braking force that increases more strongly than with soft, direct braking. When the second distance value is exceeded, braking can also additionally continue regeneratively.

According to a preferred embodiment, the braking energy recovered by regenerative braking can be supplied to an energy store. The recovered braking energy can be supplied to an electrical energy store such as a battery or a supercapacitor. The electric motor can function as a generator in this case. The recovered braking energy can also be supplied to a mechanical energy store such as a flywheel. The energy store can be arranged in or on the trailer. In particular, the electric motor can also be supplied by the electric energy store in driving mode. By means of the recuperation, the operating time of the trailer can be increased without externally charging the energy store.

Preferably, the braking force in electrically-actuated braking increases the more the distance between the trailer and towing vehicle decreases after the first distance value is exceeded. It is also preferable for the braking force in mechanically-actuated braking to increase the more the distance between the trailer and towing vehicle decreases after the second distance value is exceeded. The braking force acting on the trailer thereby increases the more the distance between the towing vehicle and trailer decreases. Preferably, the trailer is also accelerated more strongly the more the distance between the trailer and towing vehicle has increased after the third distance value is exceeded. The electrically-actuated braking and/or the mechanically-actuated braking and/or the acceleration of the trailer can be proportional, in particular linearly proportional or exponentially proportional, to the deviation of the axial distance between the trailer and towing vehicle from the neutral position. This ensures a very quickly reacting adjustment of the position of the trailer to the towing vehicle.

According to one embodiment, a bicycle can be provided as the towing vehicle, and/or a bicycle trailer can be provided as the trailer.

According to another embodiment, the electrically-actuated braking can be terminated when the distance between the trailer and towing vehicle has decreased relative to the neutral position by a fourth distance value, wherein the fourth distance value is less than the first distance value. According to the invention, the trailer is braked by electrical actuation once a first distance value is exceeded. When the distance between the trailer and towing vehicle again approaches the neutral position due to the electrically-actuated braking, the trailer is no longer braked by electrical actuation after the fourth distance value is reached, which is less than the first distance value. Accordingly, electrically-actuated braking can already be terminated before the neutral position is reached. Preferably, the mechanically-actuated braking can moreover be terminated and the electrically-actuated braking can be initiated or continued when the distance between the trailer and towing vehicle has decreased relative to the neutral position by a fifth distance value, wherein the fifth distance value is less than the second distance value but greater than the fourth distance value. In particular, the fifth distance value can also be greater than the first distance value. Proceeding from the neutral position, braking is electrically-actuated once the distance between the trailer and towing vehicle reaches the first distance value. If the distance between the trailer and towing vehicle decreases further so that the second distance value is exceeded, braking is mechanically-actuated in addition or exclusively. When the distance between the trailer and towing vehicle again approaches the neutral position due to the mechanically-actuated braking and possibly additionally electrically-actuated braking, braking is no longer by mechanical actuation after the fifth distance value, which is less than the second distance value, is reached. Braking is only by electrical actuation when the distance is reduced by less than the fifth distance value but more than the fourth distance value. If the distance between the trailer and towing vehicle re-approaches the neutral position, the trailer is no longer braked once the fourth distance is undershot. If the distance between the trailer and towing vehicle deviates in the opposite direction so that the distance between the trailer and towing vehicle is increased by at least the third distance value, the trailer is accelerated according to the invention. Preferably, the acceleration of the trailer is terminated when the distance between the trailer and towing vehicle has decreased relative to the neutral position by a sixth distance value, wherein the sixth distance value is less than the third distance value. After the distance between the trailer and towing vehicle has accordingly increased, the trailer is accelerated so that the distance between the trailer and towing vehicle again approaches the neutral position. In particular, the trailer is accelerated until the distance falls below the sixth distance value. A dead band range is therefore defined by the fourth and sixth distance value in which there is neither braking nor acceleration even when the distance between the trailer and towing vehicle deviates from the neutral position. A tolerance range is accordingly defined in which the distance between the trailer and towing vehicle can fluctuate without adjustment. The fifth distance value limits the range in which braking is only electrically-actuated.

According to a preferred embodiment, the neutral position can be defined such that the trailer lags behind the towing vehicle without forming a load. The trailer can accordingly compensate for its own weight and the weight of any load on the trailer by specifically braking, or respectively accelerating by electrical or mechanical actuation. This (follow assist mode) ensures that the towing vehicle basically does not sense any load. According to another embodiment, the neutral position can be defined such that the trailer pushes the towing vehicle. The neutral position in this case is defined such that the trailer exerts a preferably constant thrust in the axial direction on the towing vehicle. Accordingly, the towing vehicle can be relieved in this mode (push mode or ride assist mode), in particular in steep uphill travel.

According to one embodiment, the method moreover comprises the step of measuring the speed of the trailer. By measuring the speed, the trailer can be braked by electrical or mechanical actuation when the trailer exceeds a defined maximum speed. In particular, the trailer can be braked regeneratively and electrically-actuated by the electric motor, or soft or hard by a direct brake. Preferably, braking is direct. This can ensure that the towing vehicle and trailer do not exceed a defined maximum speed, in particular in steep downhill travel. The trailer can be braked by the direct brake and hence also reduce the speed of the towing vehicle.

According to another embodiment, the method is characterized in that the speed of the trailer is maintained when the untowed trailer is pushed. If the trailer is accordingly not connected to a towing vehicle but is manually pushed by an operator, for example, the trailer can be driven by the electric motor such that it maintains a defined speed so that the person pushing the trailer basically must push no load or only a slight load. If the trailer is operated in this running mode, a hand brake can be provided on the trailer to brake the trailer. Preferably, the handbrake actuates a direct brake on the trailer. The handbrake can preferably be triggered automatically if the operator releases the trailer. The trailer can also be preferably braked automatically upon exceeding a defined speed.

The invention moreover achieves the object by providing a motor-driven trailer comprising at least one wheel, an electric motor for driving the at least one wheel, at least one storage unit for supplying energy to the electric motor, a drawbar for connecting the trailer to a towing vehicle, and a sensor unit on the drawbar which is configured to measure deviations in distance that arise between the towing vehicle and trailer from a neutral position, and to generate an electrical measuring signal that corresponds to the deviation in distance. A control unit that responds to the electrical measuring signal and is configured to brake the trailer based on the electrical measuring signal when the distance between the trailer and towing vehicle is reduced relative to the neutral position by at least one first distance value, and to control the electric motor based on the electric measuring signal from the sensor unit in order to accelerate the trailer when the distance between the trailer and towing vehicle is increased by a third distance value relative to the neutral position. A mechanical trigger is configured to brake the trailer based on the deviation in distance when the distance between the trailer and towing vehicle is reduced relative to the neutral position by at least one second distance value, wherein the second distance value is greater than the first distance value.

The motor-driven trailer according to the invention is suitable for carrying out the method according to the invention. The trailer is connected to the towing vehicle by the drawbar. The sensor unit arranged in or on the drawbar measures deviations in distance that may occur between the towing vehicle and trailer in an axial direction starting from a neutral position. Moreover, the sensor unit generates an electrical measuring signal, such as an electrical voltage, corresponding to this deviation in distance. In particular, this electrical measuring signal can be proportional, for example linearly proportional or exponentially proportional, to the deviation in distance between the towing vehicle and trailer starting from the neutral position. The measuring signal accordingly contains information on the degree, or respectively strength of the deviation in distance between the towing vehicle and trailer, as well as the direction of the deviation along the axial axis between the towing vehicle and trailer, i.e., in particular on whether the distance between the trailer and towing vehicle is decreasing or increasing relative to a neutral position. Depending on whether the distance between the trailer and towing vehicle has increased or decreased, the electrical measuring signal can for example have an opposite sign; in particular, the electrical measuring signal can be positive when the distance between the trailer and towing vehicle increases relative to the neutral position, and negative when the distance between the trailer and towing vehicle decreases relative to the neutral position. Moreover, the trailer is braked by a mechanical trigger depending on the deviation in distance, in particular depending on the reduction of the distance between the trailer and towing vehicle. In addition to the electrical measuring signal, the information on a deviation in distance can also be output by the mechanical trigger. Force measuring sensors can be omitted because of the trailer according to the invention. Instead, the distance between the trailer and towing vehicle is measured and regulated by a distance measurement.

For this, braking, which preferably can regeneratively brake the trailer on the one hand or can softly brake the trailer directly on the other hand, is electrically triggered by the control unit after the first distance value is exceeded. Braking can also be simultaneously regenerative and softly direct. Regenerative braking can also be soft. Moreover, the trailer is braked by the mechanical trigger when the distance between the trailer and towing vehicle is reduced by at least one second distance value. Here, the second distance value is greater than the first distance value. Likewise, if the reduced distance between the towing vehicle and trailer reaches a second distance value, a braking unit with a direct brake can be mechanically triggered by the mechanical trigger. The braking can be hard, i.e., with a braking force that increases more strongly than with soft, direct braking. As mentioned above, the term "direct braking" and "direct brake" was selected to distinguish from regenerative braking by the electric motor and is not to be understood as a restriction of the brake design. When the second distance value is exceeded, braking can also continue regeneratively. In addition, the control unit is designed to accelerate the trailer when the distance between the trailer and towing vehicle is increased relative to the neutral position by a third distance value. As already explained above in the description of the method according to the invention, the trailer can accordingly react to the movement of the towing vehicle in that the trailer is braked regeneratively, or respectively directly, when the distance between the trailer and towing vehicle decreases excessively and is accelerated when the distance between the trailer and towing vehicle increases excessively.

According to one embodiment, the control unit responding to the electrical measuring signal can be designed to regeneratively brake the trailer based on the electrical measuring signal, and/or to directly brake the trailer softly. According to one embodiment, the mechanical trigger can also be designed to directly brake the trailer hard based on the deviation in distance. Hard, direct braking in this case exhibits a stronger rise in the braking force depending on the axial deviation in distance between the trailer and towing vehicle than soft, direct braking. Soft braking therefore means a flatter rise in the braking force as the deviation in distance increases than with hard braking. According to another embodiment, the soft and hard direct braking can be carried out by a brake unit with a direct brake, and regenerative braking can be carried out by the electric motor. The direct brake of the brake unit is electrically controlled by the sensor unit based on the electrical measuring signal for soft, direct braking. By means of the mechanical trigger, the direct brake of the brake unit is controlled mechanically for hard braking. The brake unit is directly connected to the sensor unit for controlling the hard, direct braking. The direct brakes are accordingly also capable of hard direct braking when the control unit functions incorrectly or fails, for example from a power failure. In particular, the direct brakes accordingly react very quickly.

If an electric motor is used that does not enable regenerative braking, only soft, direct braking is triggered by the electrical measuring signal via the control unit. If the electric motor is capable of recuperation, regenerative or soft, direct braking or both simultaneously are triggered by the electrical measuring signal via the control unit. The term “direct braking” and “direct brake” was selected in the present case to distinguish from regenerative braking by the electric motor and is not to be understood as a restriction in the selection of the brakes. The trailer can also have more than one wheel. Then the wheels can be braked independently from each other via the control unit based on the electrical measuring signal. For example, one wheel can be braked regeneratively by the electric motor arranged on the wheel, and a second wheel can be braked softly by the direct brake. Different braking forces can also be applied to the wheels by direct, soft braking. This increases the stability of the trailer/towing vehicle system in turning maneuvers, in particular at high speeds and when traveling in curves.

According to a preferred embodiment, the trailer furthermore comprises a motor control connected at least to the control unit and the electric motor. Preferably, the trailer also comprises an energy store such as a battery, flywheel or supercapacitor for supplying energy to the electric motor. The control unit can accordingly transmit control signals to the motor control which then controls the electric motor such that the trailer is accelerated or regeneratively braked. Also preferably, a power control can furthermore be provided that is connected to the energy store, the motor control and the control unit. Accordingly, energy can be supplied to the motor from the energy store controlled by the power control and the motor control. Recovered braking energy can correspondingly be resupplied via the motor and power control to the energy store. The electric motor can function as a generator in this case. The energy store can be arranged in or on the trailer. By means of this recuperation, the trailer can be operated with particular energy efficiency, and the operating time, in particular when a battery is used, can be increased.

According to another embodiment, the trailer comprises a consumer control for controlling electrical consumers. The consumer control can in particular be connected to any power control that may exist. Accordingly, electrical consumers such as the alternator can be supplied with energy and/or controlled by means of the consumer control.

According to a preferred embodiment, the trailer furthermore comprises a speed sensor connected at least to the electric motor and the control unit. As already explained with regard to the method, the speed sensor allows a maximum speed to be defined as well as easier pushing of the trailer which is not towed in this case.

According to one embodiment, the motor-driven trailer can be a motor-driven bicycle trailer for connecting to a bicycle as the towing vehicle.

According to one embodiment, the sensor unit of the trailer comprises a pull rod for connecting to the towing vehicle, and a housing that has means for connecting to the trailer and a distance sensor arranged in the housing, characterized in that:

The distance sensor measures a deviation of the distance between the housing and pull rod from a neutral position, and The distance sensor generates a first electrical measuring signal corresponding to the deviation in distance when the distance between the housing and pull rod is decreased relative to the neutral position by at least one first distance value, wherein the pull rod interacts with a mechanical trigger that experiences a deflection corresponding to the deviation in distance when the distance between the housing and pull rod is reduced relative to the neutral position by at least one second distance value, wherein the second distance value is greater than the first distance value, and The distance sensor generates a second electrical measuring signal corresponding to the deviation in distance when the distance between the housing and pull rod is increased relative to the neutral position by a third distance value.

When the distance between the housing and pull rod has decreased enough to reach or exceed a first distance value, the distance sensor generates a corresponding first electrical measuring signal. Furthermore, the distance sensor generates a second electrical measuring signal when the distance between the housing and the pull rod is increased. The electrical measuring signals correspond to the respective axial deviation in distance, and accordingly bear information on the extent of the deviation in distance. The first and the second electrical measuring signal can in particular differ by having different signs. The electrical measuring signals can for example be electrical voltages. When the sensor unit is connected to a towing vehicle and a trailer, the trailer can be electrically braked based on the first electrical measuring signal and accelerated based on the second electrical measuring signal. The electric braking can be regenerative by means of an electric motor of the trailer, or soft and direct by means of a direct brake. Moreover, an axial deviation in distance between the housing and pull rod leads to a deflection of a mechanical trigger when the distance between the housing and pull rod is reduced relative to the neutral position by at least one second distance value, wherein the second distance value is greater than the first distance value. After a second distance value is reached, or respectively exceeded, the mechanical trigger is deflected instead of or in addition to the generation of the first electrical measuring signal. When the sensor unit is connected to a towing vehicle and a trailer, a direct brake of the trailer can be mechanically-actuated by the deflection of the mechanical trigger. The mechanically-actuated braking can in particular trigger a hard, direct braking. The hard, direct braking exhibits a stronger rise in the braking force depending on the axial deviation in distance between the housing and pull rod, and hence between the trailer and towing vehicle than soft, direct braking. Depending on the first and the second electrical measuring signal as well as the deflection of the mechanical trigger, the trailer can react to the movement of the towing vehicle such that the trailer is braked when the distance between the housing and pull rod, and hence between the trailer and towing vehicle, is excessively reduced, and is accelerated when the distance between the trailer and towing vehicle is excessively increased. By means of an electrical actuator in the sensor unit, the electrical measuring signal generated by the distance sensor can trigger the soft, direct braking. In addition, the control unit of the motor-driven trailer according to the invention can be part of the sensor unit according to the invention. Force measuring sensors can be omitted because of the sensor unit according to the invention. Instead, the distance between the trailer and towing vehicle is measured and regulated by a distance measurement. In particular, the connection between the trailer and towing vehicle can be configured relatively flexibly given the play of the pull rod relative to the housing. The trailer/towing vehicle system is accordingly less sensitive to lateral forces between the trailer and towing vehicle.

According to a preferred embodiment, the distance sensor of the sensor unit has an angle sensor with a rotatably mounted sensor lever that is deflected from the neutral position by an axial movement of the pull rod relative to the housing. Accordingly, the axial movement of the pull rod can be converted into a rotational movement of the sensor lever. In particular, the sensor lever can rotate in opposite directions by means of the axial movement of the pull rod depending on whether the axial distance between the housing and pull rod starting from the neutral position is increased or decreased. Depending on the angular position of the sensor lever achieved by this rotation, the first electrical measuring signal corresponding to the axial deviation in distance or the second electrical measuring signal is generated. In another embodiment, the pull rod can comprise an extension with a pin that is guided in a groove of the sensor lever of the distance sensor. This allows a particularly low-impact conversion of the axial movement of the pull rod into the rotational movement of the sensor lever. The extension with the pin for being guided in the groove of the sensor lever can also be provided on a tappet of the pull rod, wherein the tappet can be arranged on an end of the pull rod lying within the housing. According to another embodiment, the sensor unit can have an electrical actuator that triggers the soft, direct braking. Based on the first electrical measuring signal emitted by the angle sensor, the electrical actuator can accordingly be controlled that, by means of a mechanical tie bar, in turn triggers direct, soft braking depending on the deviation in distance between the pull rod and housing.

Furthermore, according to a preferred embodiment, the trigger of the sensor unit can have a rotatably mounted trigger rocker that can be deflected from a home position by an axial movement of the pull rod relative to the housing. Accordingly, when the deviation of the axial distance between the housing and pull rod exceeds the second distance value, the rotatably-mounted trigger rocker can be deflected out of its home position. When the sensor unit is connected to a towing vehicle and a trailer, the trailer can be braked corresponding to the deflection of this trigger rocker. In particular, the trailer can thereby be directly braked hard. According to another embodiment, the trigger has a return spring that returns the trigger rocker into the home position when the pull rod no longer deflects the trigger rocker. This ensures that the trigger rocker always returns to the home position and is accordingly no longer braked when the deviation of the axial distance between the housing and pull rod no longer exceeds the second distance value.

According to a preferred embodiment, the trigger furthermore comprises a damping unit that counteracts the return spring and returns the trigger rocker into the home position in a dampened manner when the pull rod no longer deflects the trigger rocker. This ensures that the braking caused by the deflection of the mechanical trigger slowly attenuates when the pull rod no longer deflects the trigger rocker. Accordingly, the braking is terminated slowly and in a dampened manner.

According to one embodiment, the sensor unit can be designed to measure the distance between a bicycle trailer, in particular a motor-driven bicycle trailer according to the invention, and a bicycle as the towing vehicle.

According to one embodiment, the sensor unit comprises a housing, a pull rod extending out of the housing for connection to the drawbar, wherein the pull rod is mounted so as to be shiftable relative to the housing, and a distance a sensor which determines the relative position between the housing and pull rod, wherein the pull rod is shiftably held within a normal range without a mechanical restoring force, wherein the normal range extends beyond the first and third distance value. Accordingly, a normal range can be defined as the normal operating range within which a restoring force on the pull rod, or respectively its housing, only occurs based on the electrical measuring signals, i.e., only by a braking, or respectively acceleration of the trailer. Within this normal range, there is in particular no mechanical damping apart from unavoidable friction losses. The pull rod slides more-or-less free of resistance (apart from said friction losses) through the housing. Such a purely electronic regulation is very precise. In particular, there are no disturbing coupling effects such as vibrations since the pull rod is borne entirely freely in the housing by the movable support body. In particular, negative effects of pretensioned systems can thus be prevented which would result in pulsating behavior of the sensor unit. It is important to maintain such a normal operating range since a plurality of external disturbance variables arise in the routine operation of the trailer such as uneven roads, changing loads to be transported by the trailer, fluctuating wind conditions and different driving behavior by the user. To enable such exact regulation, it is important to know the precise position of the electric motor. For this, the electric motor can have a rotary encoder that can determine the current position of the electric motor with high precision and transmit it to the control apparatus. An independent wheel suspension for the wheels of the trailer can also be provided in order to dampen vibrations and oscillations from the ground.

The normal range can be limited by other distance values; for example the normal range can be limited in one direction by the second distance value. In particular, the normal range can be spatially limited by two end stops. The end stops can for example be formed by two springs, wherein a first spring dampens a movement of the pull rod in a first direction, and a second spring dampens the movement of the pull rod in a second direction. The pull rod accordingly experiences a mechanical restoring force by means of the springs; however, only outside of the normal range, i.e., in the case of large accelerations, or respectively delays. Within the normal range, the pull rods do not come into contact with the springs.

According to another embodiment, the sensor unit furthermore comprises a plurality of rollers connected to the pull rod and guide elements accommodating the rollers and forming a part of the housing, wherein the pull rod is movably mounted on the rollers relative to the guide elements. Such a bearing has very slight friction losses. The guide elements can be arranged on opposite sides of the pull rod and accommodate rollers arranged on both sides of the pull rod. In particular, three rollers can be provided on each of both sides. By means of a plurality of rollers, force and torque can be compensated that arise when the trailer tilts forward if, viewed from the bicycle, the center of mass of the trailer is located in front of the trailer wheels.

According to another embodiment, the mechanical trigger comprises a damping unit with a damper rod and a driver that is connected to the pull rod, wherein the mechanical trigger brakes the trailer in that the driver drives the damper rod into the damping unit by a movement of the pull rod. In a braking movement, the pull rod is moved into the housing and entrains the damper rod of the damping unit by means of the driver. This solution is structurally very simple. Moreover, the mechanical brake can be gradually disengaged by the damping unit and thus allows a slow decrease in the braking force.

BRIEF DESCRIPTION OF THE DRAWINGS

An exemplary embodiment of the invention is explained in greater detail below with reference to several figures. In the figures.

If not otherwise indicated, the same reference signs indicate the same objects in the following.

DETAILED DESCRIPTION OF THE INVENTION

Figure 1:
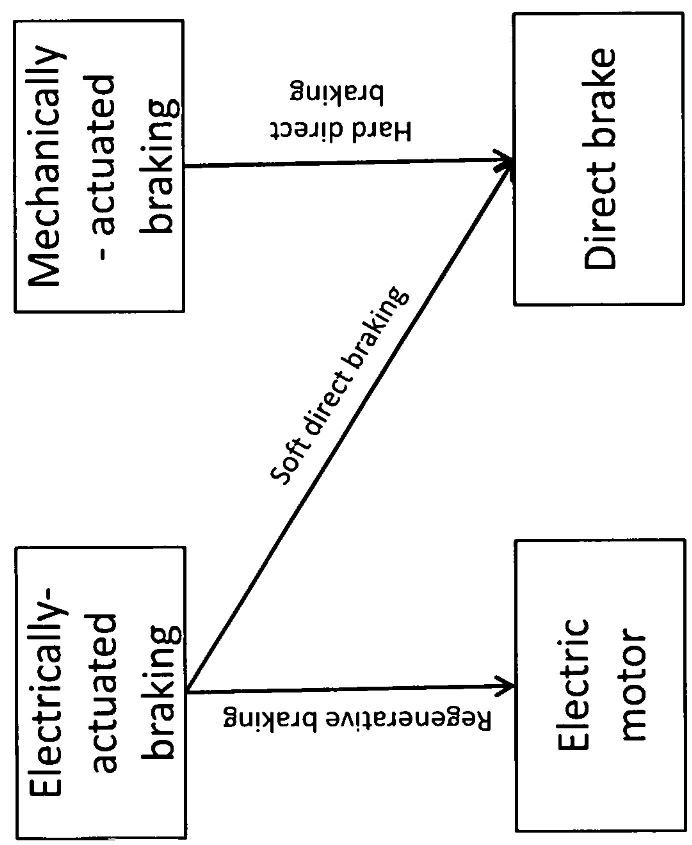
FIG. 1 shows a diagram of the types of braking triggered by the electrically and mechanically-actuated braking.

FIG. 1 shows a diagram of the different types of braking. The electrically-actuated braking can either trigger regenerative braking by means of the electric motor or soft, direct braking by means of a direct brake. These two types of braking can also be triggered simultaneously and supplement each other. Mechanically-actuated braking, in contrast, only controls the direct brake and accordingly triggers hard, direct braking. This connection is purely mechanical (or hydraulic).

Figure 2:
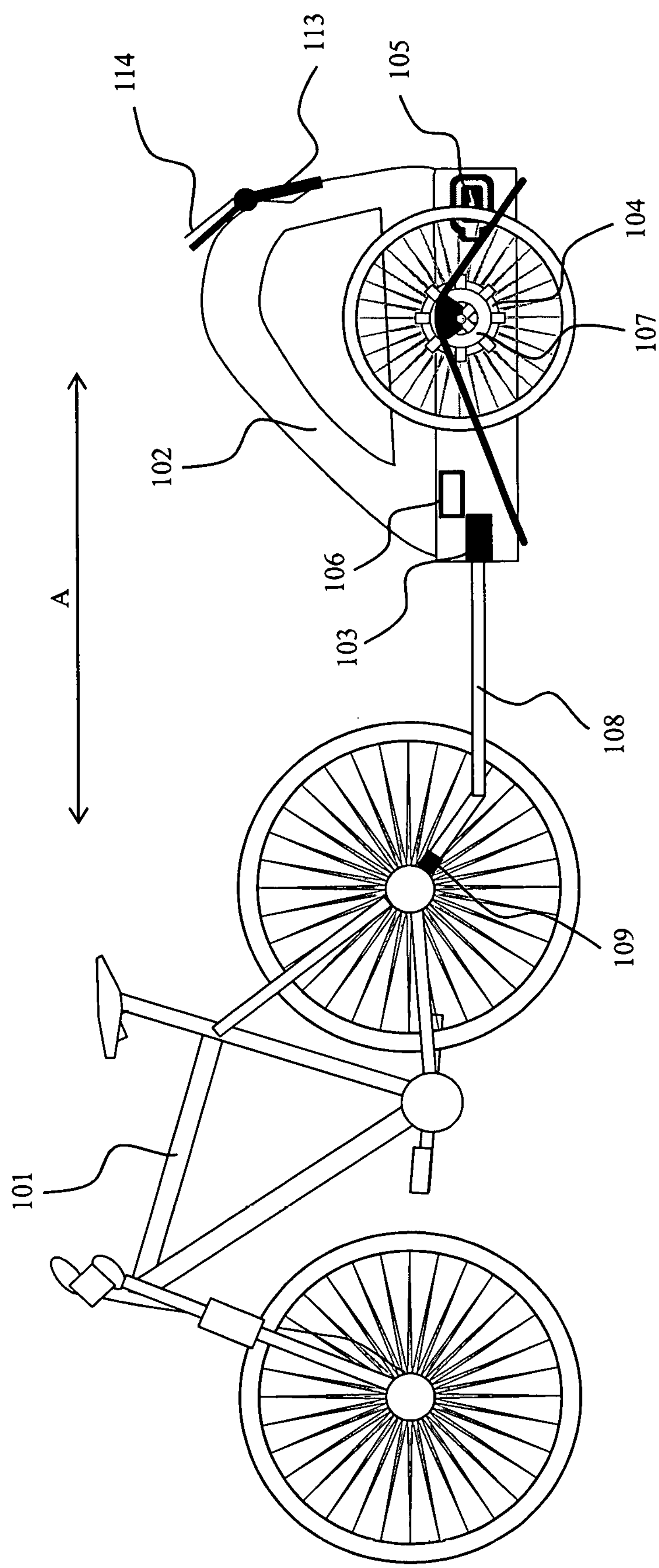
FIG. 2 shows a motor-driven trailer according to the invention with a bicycle as the towing vehicle, FIG. 3 schematically shows the method according to the invention, in particular lag mode and thrust mode, FIG. 4 also shows the method according to the invention, in particular running mode.

FIG. 2 shows a motor-driven trailer 102 according to the invention that is connected by a drawbar 108 and a connecting part 109 to a bicycle 101. The trailer 102 has two wheels 110, of which only one is shown. In the present exemplary embodiment, the wheels are connected to each other by an axle. In principle, the wheels can, however, also not be connected to each other. The trailer 102 furthermore comprises an electric motor 104 that is arranged on one of the wheels 110. Another electric motor can, however, also be provided on the other wheel. The electric motor can also be arranged on the axle. The trailer 102 is driven by the electric motor 104, which draws its energy from the battery 105. Moreover, the trailer 102 has a control unit 106 that controls the electric motor 104 as well as a brake 107 arranged on one of the wheels 110. However, brakes can also be provided and controlled on both wheels 110 or on the wheel axle. A sensor unit 103 connected to the drawbar 108 is arranged on or within the trailer 102. The sensor unit 103 measures any deviation in distance between the bicycle 101 and trailer 102 in an axial direction A starting from an above-defined neutral position. “In an axial direction” means along an imaginary connecting line between the bicycle and trailer. The sensor unit 103 transmits a measuring signal based on the deviation in distance to the control unit 106. Depending on the measuring signal emitted by the sensor unit 103, the control unit 106 can control the electric motor 104, or respectively the brakes 107, and thus accelerate or brake the trailer relative to the bicycle.

Figure 3:
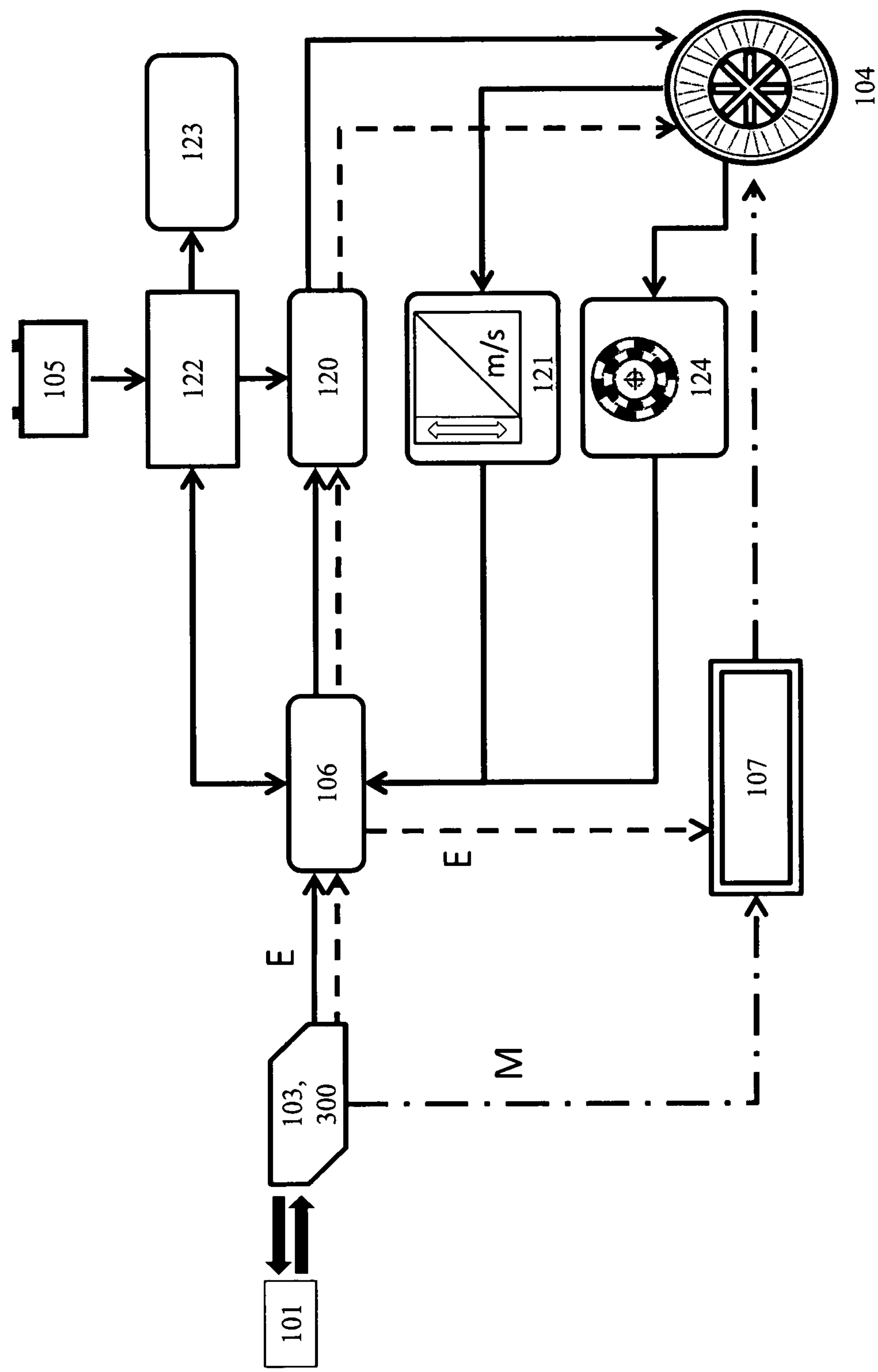

FIG. 3 schematically shows the method according to the invention in conjunction with the components of the motor-driven trailer according to the invention. The sensor unit 103, 300 can for example be arranged in or on the trailer 102 as shown in FIG. 2. All of the other shown objects are preferably arranged on or in the trailer. The control unit 106 can however also be part of the sensor unit 103, 300. The control unit 106 is electrically connected to the sensor unit 103, 300 and the brake unit 107 by the connections E. The control unit 106 receives electrical measuring signals from the sensor unit 103, 300, processes them, and transmits them to the motor control 120. The signal characteristic is shown by the solid arrow line, or respectively the dashed arrow line. The electric motor 104 is finally controlled by the motor control 120. In addition, the control unit 106 is connected to a power control 122. By means of the power control, electrical energy from a battery 105 can be conducted by the motor control to the electric motor 104, and the electric motor 104 can accordingly be driven. In principle, another energy store can also be provided instead of or in addition to the battery. Moreover, a consumer control 123 is connected to the power control 122. By means of the consumer control, for example one or more bicycle lights can be operated. A brake unit 107 also receives electrical measuring signals from the sensor unit 103, 300. The brake unit 107 can for example have one or more brakes (not shown) that are arranged on one of the wheels 110 or on the wheel axle. The brake unit 107 is connected by an electrical connection E to the control unit 106 and by a mechanical connection M to the sensor unit 103, 300. In addition, a rotary encoder 124 can be provided that is connected to the electric motor 104. The rotary encoder 124 can for example be integrated into the electric motor 124.

The sensor unit 103, 300 is designed to measure deviations in distance arising between the bicycle and trailer in an axial direction and to generate electrical measuring signals corresponding to the deviation in distance. These deviations in difference are measured depending on an axial distance between the trailer and bicycle defined previously as the neutral position. When the bicycle is braked, the distance between the bicycle and trailer decreases and a deviation in distance arises in an axial direction. The sensor unit 103, 300 generates a first electrical measuring signal corresponding to the deviation in distance when the distance between the trailer and bicycle is decreased relative to the neutral position by at least one first distance value. The first electrical measuring signal is sent to the control unit 106 which, by means of the motor control 120, then operates the electric motor 104 as a generator and regeneratively brakes the trailer. The signal characteristic is identified by the dashed arrow line. In this case, braking energy generatively recovered by the electric motor 104 can be returned to the battery 105 by means of the power control 122. By means of an electrical connection E, the control unit 106 can also electrically control the braking unit 107, and hence direct braking, based on the first electrical measuring signal in order to directly brake softly.

If however the distance between the bicycle 101 and trailer 102 decreases by at least one second distance value relative to the neutral position, wherein the second distance value is greater than the first distance value, a mechanical trigger of the sensor unit 103, 300 is then deflected. On the basis of this deflection, the brake unit 107 is controlled by means of the mechanical connection M, and direct braking of the brake unit 107 is triggered. In particular, this causes hard, direct braking. The mechanical connection M can however also be a hydraulic connection so that direct braking of the brake unit 107 is hydraulically triggered. The mechanical transmission of information is shown in FIG. 3 by the dash-dotted arrow line. A signal can also be sent by the brake unit 107 to the electric motor 104, for example in order to stop the electric motor 104 in the case of a malfunction of the control unit 106. In addition to the second measuring signal, the first electrical measuring signal that triggers regenerative braking can also be forwarded via the control unit 106 and the motor control 120 to the electric motor 104. It is accordingly possible to brake regeneratively and directly at the same time.

When the bicycle is accelerated so that the distance between the trailer and bicycle increases relative to the neutral position, the sensor unit 103, 300 generates a corresponding second electrical measuring signal. This second electrical measuring signal is transmitted to the control unit 106 which causes the electric motor 104 to accelerate via the motor control 120. The signal characteristic is identified by the solid arrow line. The level of the second electrical measuring signal generated by the sensor unit depends on how strongly the determined distance between the trailer and bicycle deviates from the neutral position. Due to the second electrical measuring signal, the motor control 120 and thereby the electric motor 104 are controlled by the control unit 106 such that the trailer 102 is accelerated until the distance between the trailer and bicycle again reaches the neutral position.

Depending on the definition of the neutral position, the trailer can be operated in lag mode or in thrust mode. In lag mode, the neutral position and hence the distance between the trailer and bicycle is defined so that the trailer lags behind the bicycle without forming a noticeable load. In thrust mode, the neutral position is defined so that the trailer always exerts thrust on the bicycle in the neutral position.

Moreover, a speed sensor 121 is shown in FIG. 3. The speed sensor 121 measures the speed of the trailer and interacts for example with the electric motor 104, and/or with the wheels 110, and/or the axle 111 of the trailer. The measured speed is transmitted by the speed sensor 121 to the control unit 106. Depending on the speed measured by the speed sensor, lag mode and/or thrust mode can be activated. For example, it is possible to deactivate thrust mode at high speeds that can arise inter alia in downhill travel, and to activate thrust mode in uphill travel. In order to determine whether travel is uphill or downhill, a slope sensor (not shown) can be provided alternatively or in addition.

The rotary encoder 124 can determine the current position of the electric motor 104 with high precision and thereby improves the regulation according to the invention by means of a more precise control of the electric motor 104. In particular, movements starting from the standstill can thus be better controlled. A precise control of the electric motor 104 is quite important especially in the design of the sensor unit explained below.

Figure 4:
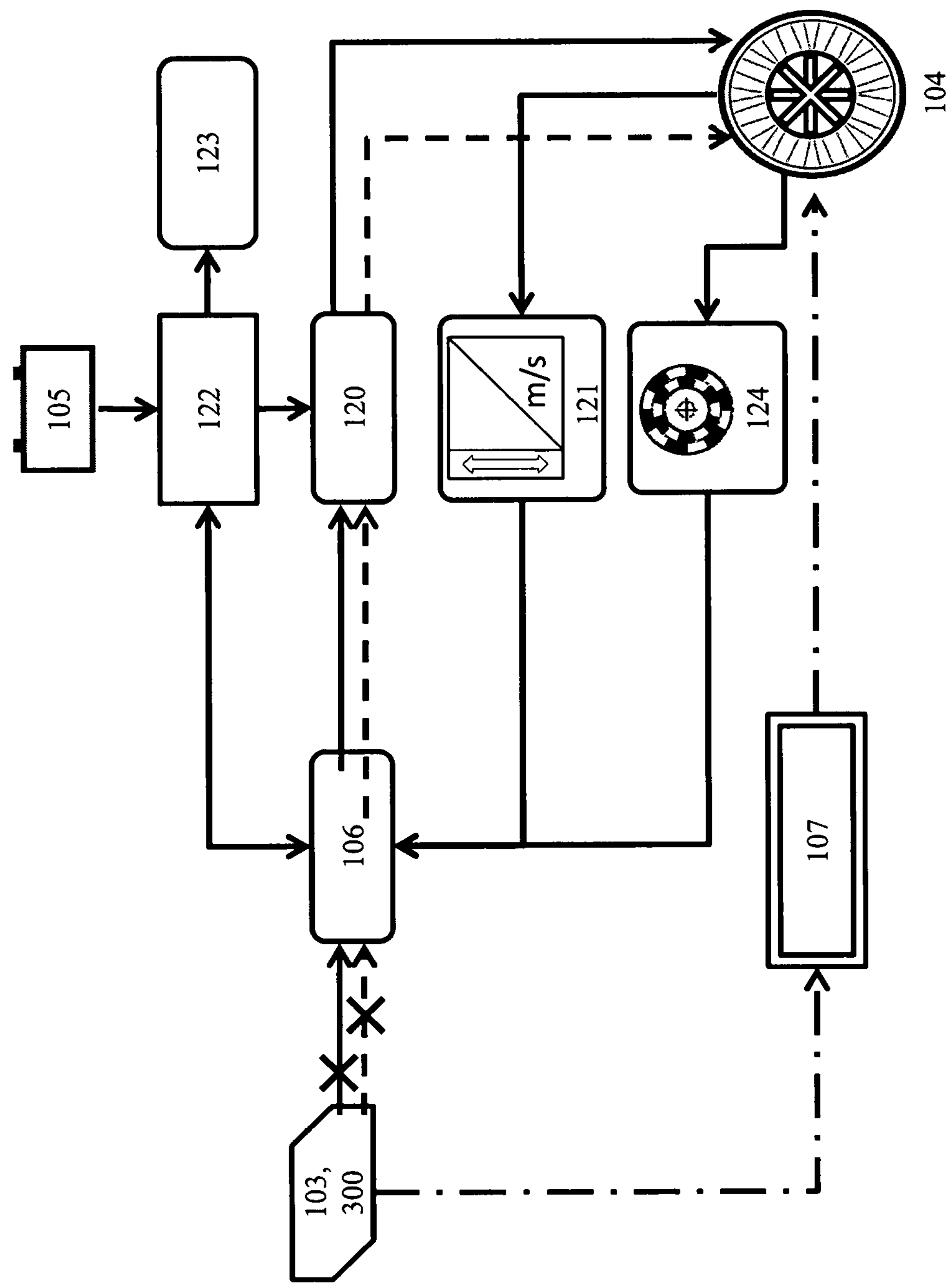

FIG. 4 differs from FIG. 3 in that the trailer according to the invention is only operated in running mode. Running mode can for example be activated when the sensor unit 103 is disengaged from the bicycle together with the drawbar 108. The trailer 102 can then be pushed by an operator from behind via grip surfaces 113. In running mode, the control unit 106 does not receive any measuring signals from the sensor unit 103, or respectively ignores the signals that it receives from the sensor unit 103. Instead, the control unit 106 receives the measuring signals from the speed sensor 121 and controls the electric motor 104 such that a speed of the trailer that is reached is maintained. This makes it easier for the operator to push the trailer, in particular up a strong slope. The operator can brake the trailer with a hand brake 114 (see FIG. 2). Other sensors (not shown) can be provided that trigger the braking of the trailer once the operator leaves the trailer.

Figure 5:
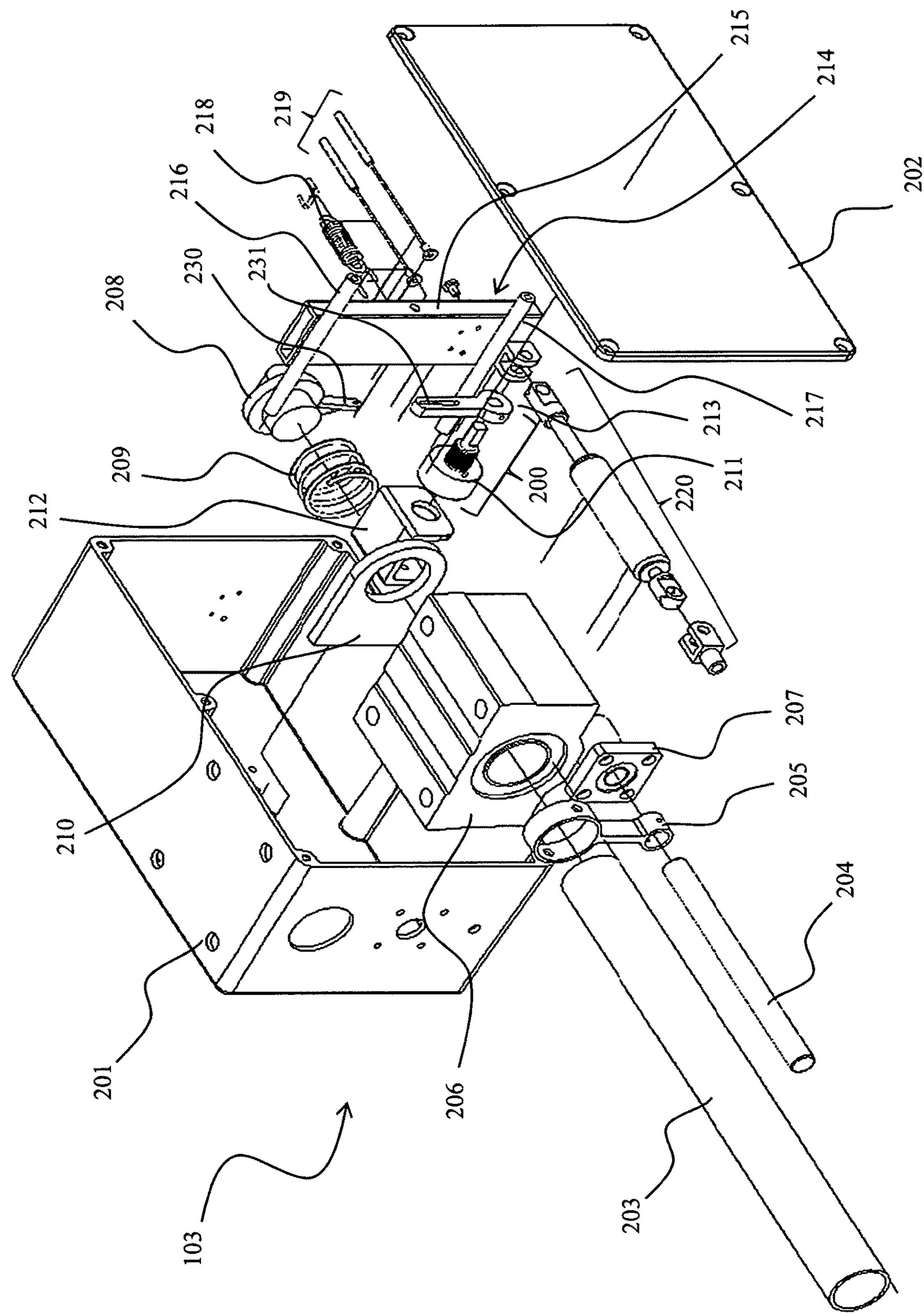
FIG. 5 shows the sensor unit according to the invention in an exploded view, FIGS. 6.1-6.4 show different deflections of the sensor unit from FIG. 5.

FIG. 5 shows a first embodiment of the sensor unit 103 according to the invention in an exploded view. The sensor unit comprises a housing 201 with a removable side surface 202 and an opening in the housing 201 for a pull rod 203 for connecting to a bicycle. The shown sensor unit can be attached to the trailer 102 directly or to the drawbar 108. Moreover, a compensating rod 204 is arranged parallel to the pull rod 203 that reinforces the connection between the trailer and bicycle perpendicular to the axial direction. In particular, force and torque can be compensated that arise when the trailer tilts forward if, viewed from the bicycle, the center of mass of the trailer is located in front of the trailer wheels. The pull rod 203 and compensating rod 204 are connected by a common connecting piece 205 as well as by the holders 206 and 207 to the housing 201. Both the pull rod 203 as well as the compensating rod 204 can move in an axial direction along the connecting line between the bicycle and trailer. At its end lying within the housing 201, the pull rod 203 has a tappet 208 and a spiral spring 209, as well as a spring seat 210 for the one-sided attachment of the spiral spring 209. The tappet 208 has an extension 230 with a pin that engages in a groove 231 of a sensor lever 213. The sensor lever 213 and an angle sensor 211 are part of a distance sensor 200 that is connected to the housing 201 by a mounting plate 212. The angle sensor 211 is connected to the control unit 106 of the trailer in a manner not shown.

A trigger is shown at reference sign 214 that comprises a trigger rocker 215, a stop 216, a return spring 218 as well as a damping unit 220. The trigger 214 is connected to the brake unit 107 of the trailer by connecting elements 219.

Figure 6:
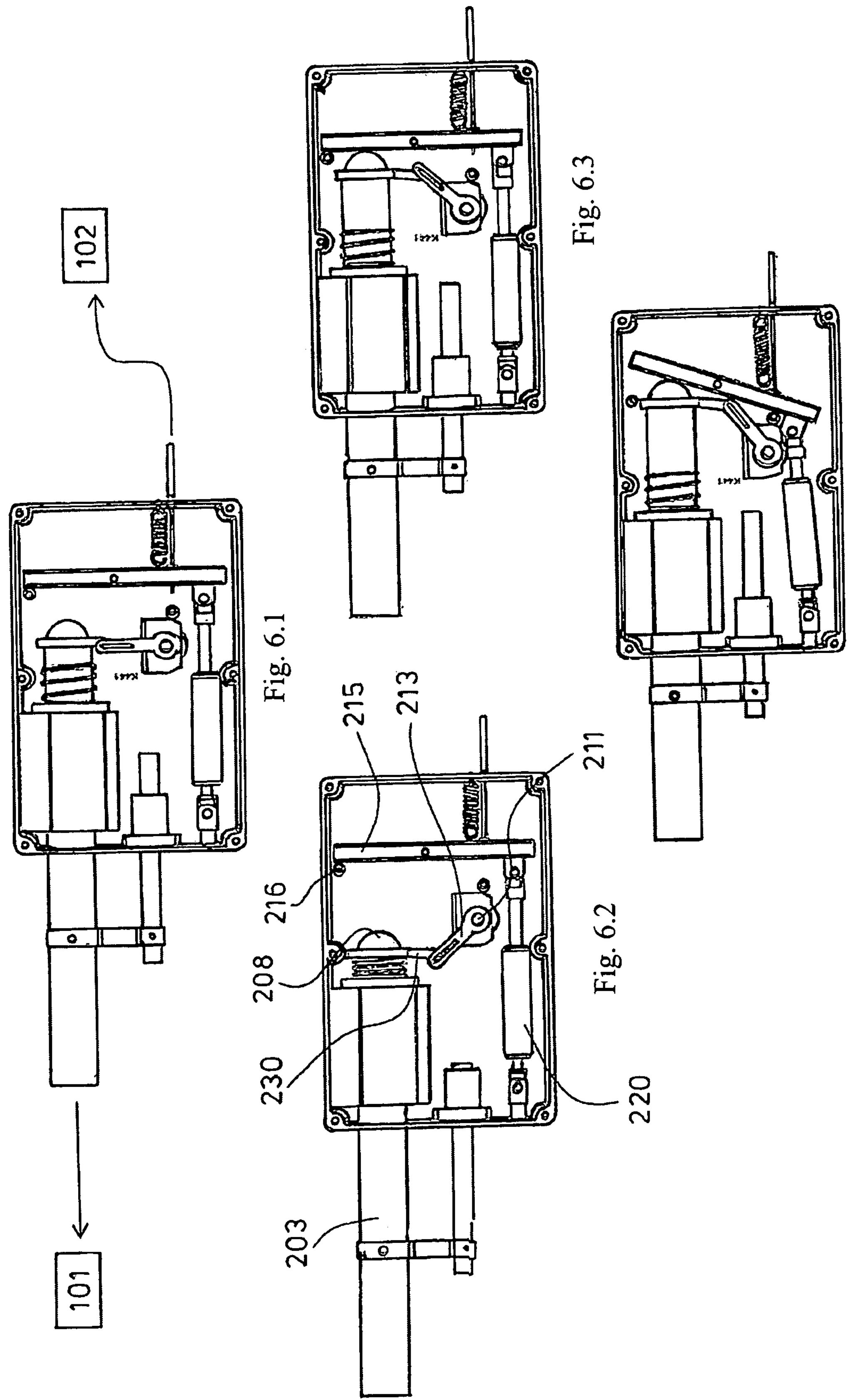

First, a certain distance between the bicycle 101 and trailer 102 is defined as the neutral position. FIG. 6.1 shows the sensor unit in the neutral position. If the bicycle is accelerated in driving mode, the distance between the bicycle and trailer increases, and the pull rod 203 is drawn somewhat out of the housing 201 together with the compensating rod 204. This movement of the pull rod 203 causes the sensor lever 213 to rotate to the left via the spring 230 of the tappet 208 as shown in FIG. 6.2. Accordingly, the translatory movement of the pull rod 203 is converted into a rotational movement of the sensor lever 213 and hence of the angle sensor 211. The angle sensor 211 transmits a (second) electrical measuring signal corresponding to the deflection to the control unit 106 of the trailer. Based on the measuring signal, the control unit 106 correspondingly controls the electric motor 104 via the motor control 120 in order to accelerate the trailer. The trailer is basically accelerated until the sensor lever again reaches the neutral position.

Figure 7:
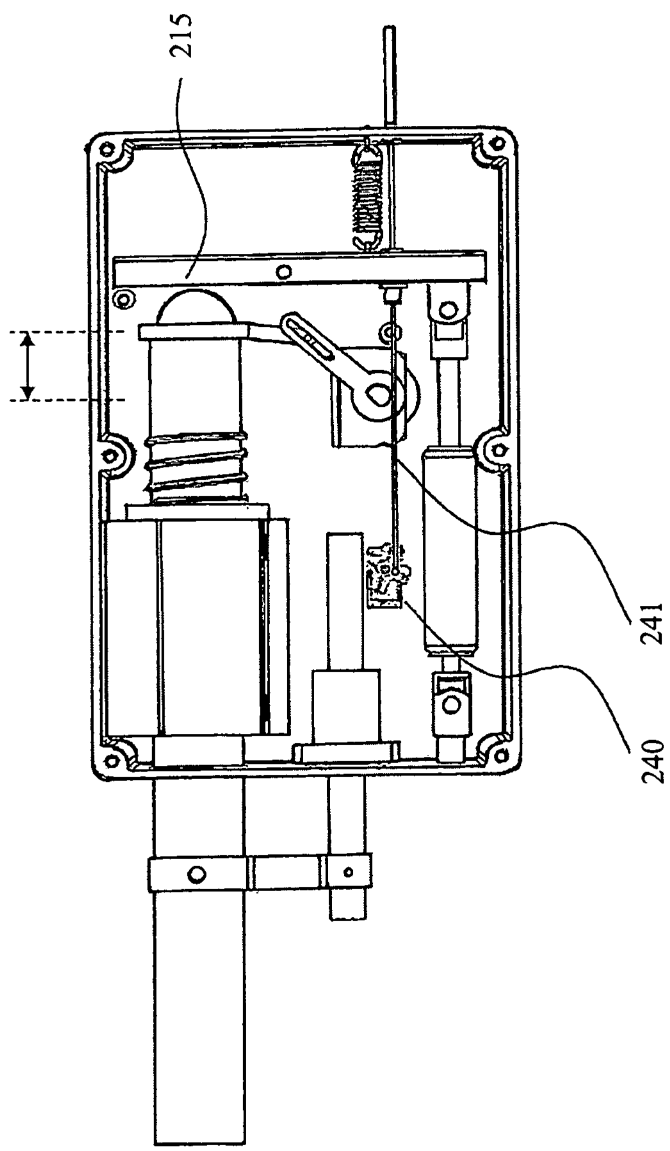
FIG. 7 shows another view of the sensor unit from FIG. 5, FIG. 8 schematically shows a hysteresis curve corresponding to the different deflections of the sensor unit from FIG. 5.

If the bicycle 101 is braked, the distance between the bicycle 101 and trailer 102 is reduced. The pull rod 203 and the compensating rod 204 penetrate further into the housing, and the pull rod 203 pushes the sensor lever 213 to the right via the tappet 208 and spring 230. This is shown in FIG. 6.3 and FIG. 7. The angle sensor 211 generates a (first) electrical measuring signal corresponding to the deflection which is transmitted to the control unit 106 and regeneratively brakes the trailer via the electric motor 104, or softly brakes the trailer directly via the brake unit 107. The sensor unit can also have an electrical actuator 240 that triggers soft, direct braking (FIG. 7). Based on the first electrical measuring signal emitted by the angle sensor 211, the electrical actuator 240 can accordingly be controlled that, by means of a mechanical tie bar 241, in turn triggers direct, soft braking depending on the deviation in distance between the pull rod and housing. In the shown exemplary embodiment, the tie bar 241 is guided by the trigger rocker 215.

If the distance between the bicycle and trailer, and hence between the housing and pull rod, increases further, the tappet 208 of the pull rod 203 then actuates the trigger rocker 215 of the trigger 214 as shown in FIG. 6.4. Due to the deflection of the trigger rocker 215, the direct brakes of the brake unit 107 of the trailer are triggered such that braking is hard and direct.

Figure 8:
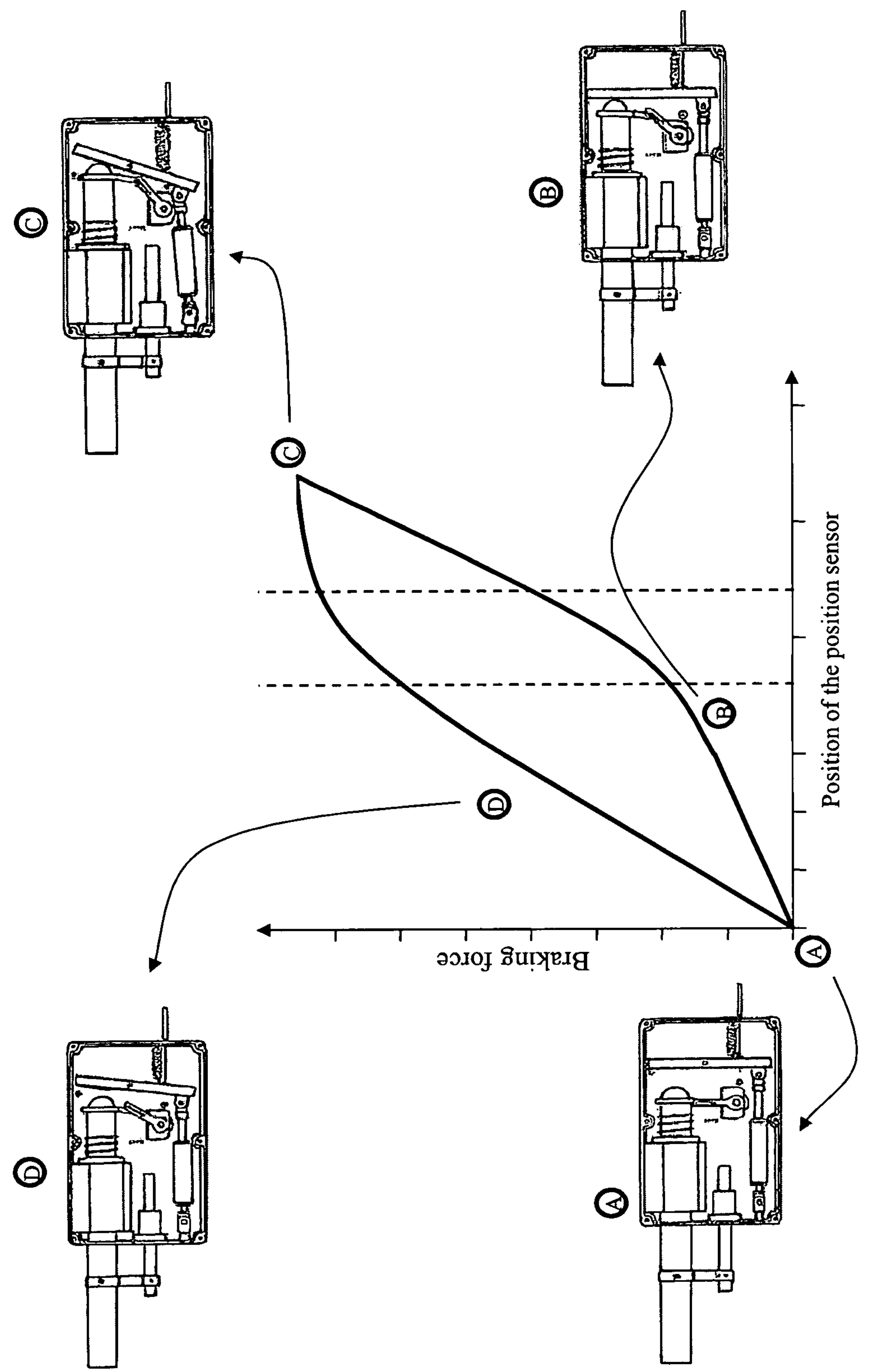

FIG. 8 shows the braking process with the sensor unit according to the invention. The diagram shows the braking force on the y-axis and the position of the angle sensor on the x-axis. Letters a-d indicate the different deflections of the angle sensor. At letter a), the angle sensor is in the neutral position. The angle sensor is not deflected, and therefore no braking force ensues. If the distance between the bicycle and trailer, and hence between the pull rod and housing, then decreases, the angle sensor is deflected to the right as shown at letter b). Within this range, the angle sensor outputs the first electrical measuring signal which triggers regenerative braking and/or soft, direct braking. The more the distance between the trailer and bicycle decreases, the stronger the regenerative and/or soft, direct braking. If the distance between the trailer and bicycle decreases further, the trigger rocker is actuated as shown at letter c). Once the trigger rocker is actuated and the trigger is therefore deflected, the direct brakes are triggered hard. In the present example, regenerative braking stops in this case. The more the distance between the trailer and bicycle decreases, the stronger the hard, direct braking.

Due to the braking process, the distance between the bicycle and trailer again approaches the neutral position. The pull rod and its tappet accordingly move away from the trigger rocker which then swings back into its home position. However, this occurs relatively slowly due to the trigger damping unit. The cessation of the hard, direct braking process is accordingly dampened, which is reflected in the hysteresis curve by a slow decrease of the braking force as the deflection of the sensor position decreases (dampened direct braking). If the distance between the bicycle and trailer continues to approach the neutral position, regenerative braking also resumes. This is shown at letter d). Once the trigger rocker again reaches its home position, braking by the control unit is exclusively regenerative and/or soft and direct. The braking process ends once the neutral position is again reached.

Figure 9:
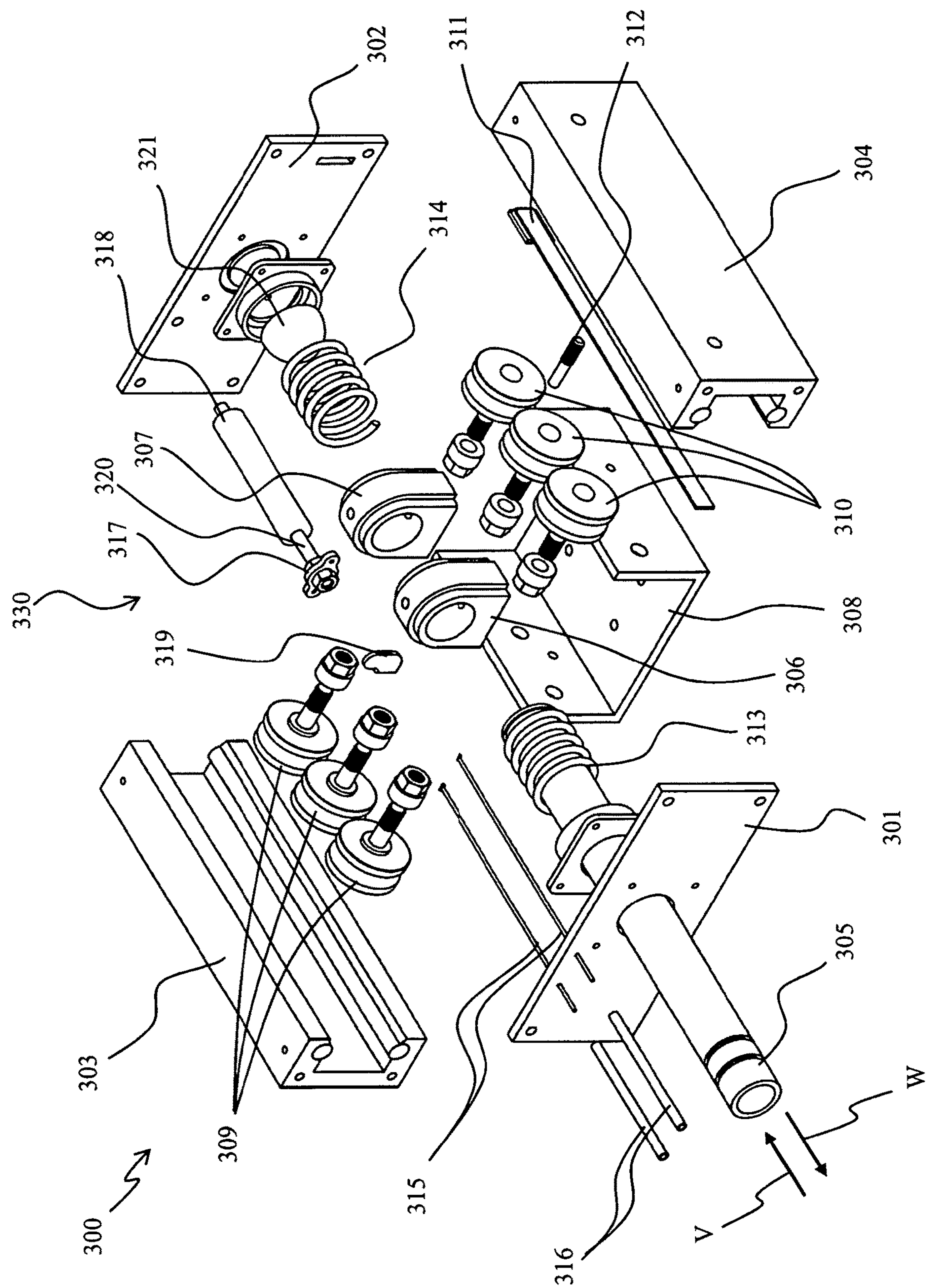
FIG. 9 shows the sensor unit according to the invention according to another embodiment in an exploded view, FIGS. 10.1-10.4 show different deflections of the sensor unit from FIG. 9, FIG. 11 schematically shows a hysteresis curve corresponding to the different deflections of the sensor unit from FIG. 9.

FIG. 9 shows a sensor unit 300 according to an alternative embodiment. The sensor unit 300 comprises a front plate 301, a back plate 302, as well as side elements 303, 304. Furthermore, top and bottom covers (not shown) can be part of the housing. The front plate 301 has an opening for a pull rod 305 for connecting to a bicycle. The pull rod 305 can be connected to the drawbar 108 or form a part thereof. The sensor unit 300 can be attached to the trailer 102 directly or to the drawbar 108. Furthermore, the pull rod 305 is securely connected via a first anchor piece 306 and a second anchor piece 307 to a C-shaped support body 308. Three rollers 309, 310 are arranged on each side of the support body 308. The support body 308 and hence the pull rod 305 connected to the support body 308 are borne on the side elements 303, 304 by the rollers 309, 310. By means of the plurality of rollers 309, 310, force and torque can be compensated that arise when the trailer tilts forward if, viewed from the bicycle, the center of mass of the trailer is located in front of the trailer wheels. The side elements 303, 304 are in turn connected to the trailer.

A sensor strip 311 of a linear potentiometer is attached to the side element 304, while a sensor element 312 connected to the support body 308 is arranged opposite the sensor strip 311. The sensor strip can of course also be arranged in the side element 303. The sensor strip could also be connected to the support body, and the sensor element could also be arranged on one of the side elements. Springs 313, 314 grasp the pull rod 305 and are fastened by holders to the front plate 301, or respectively to the back plate 302. The spring 314 moreover has a spring damper 321. Moreover, a mechanical trigger 330 is provided for the mechanical brake that at least comprises pull cables 315, a damping unit 318 and a driver 319. The pull cables 315 are mounted at one end via cable sleeves 316 to the front plate 301, and at their other end via a connecting piece 317 to a damper rod 320 of the damping unit 318. The damping unit 318 is fastened to the back plate 302, and the driver is fastened to the support body 308.

The pull rod 305 can be moved in an axial direction A along the connecting line between the bicycle and trailer. In the event of a relative movement between the bicycle and trailer, the pull rod 305 moves along its longitudinal axis in direction V or W in that it slides together with the support body 308 by means of the rollers 309, 310 along the side elements 303, 304. The relative movement between the bicycle and trailer thus corresponds to a relative movement between the pull rod 305 and the sensor housing, in particular the side elements 303, 304. In a braking process, the distance between the bicycle and trailer decreases which leads to a movement of the pull rod 305 into the housing along the direction identified by V. In an acceleration, the distance between the bicycle and the trailer increases, which moves the pull rod 305 out of the housing along the direction identified by W. In such a movement of the pull rod 305, the sensor element 312 connected to the support body 308 moves along the sensor strip 311. An electrical measuring signal is generated depending on the relative position between the sensor strip 311 and sensor element 312 (and hence on the distance between the bicycle and the trailer). This is transmitted to the control unit 106 which carries out a regulation in the above-described manner.

In the normal operating range, i.e., with moderate accelerations and delays, the pull rod 205 moves mechanically basically undampened along its longitudinal axis. "Undampened" in this case means that no additional mechanical damping mechanisms are provided; the pull rod 205 is thus shiftably held within a normal range without a mechanical restoring force. The pull rod slides freely on the support body within the housing. The movement of the pull rod 305, or respectively the housing accommodating the pull rod 305, is only regulated based on the electrical measuring signals by a relative movement between the housing and pull rod. The springs 313, 314 only serve to cushion a movement of the pull rod 305 in the case of particularly strong deflections. Within the normal operating range, the pull rod 305 does not come into contact with the springs 313, 314. Such a purely electronic regulation is very precise. In particular, there are no disturbing coupling effects such as vibrations since the pull rod is borne entirely freely in the housing on the movable support body. To enable such exact regulation, it is important to know the precise position of the electric motor. The aforementioned rotary encoder 124 is used for this. It can determine the current position of the electric motor 104 with high precision and thereby improves the regulation according to the invention by means of a more precise control of the electric motor 104.

Figure 10:
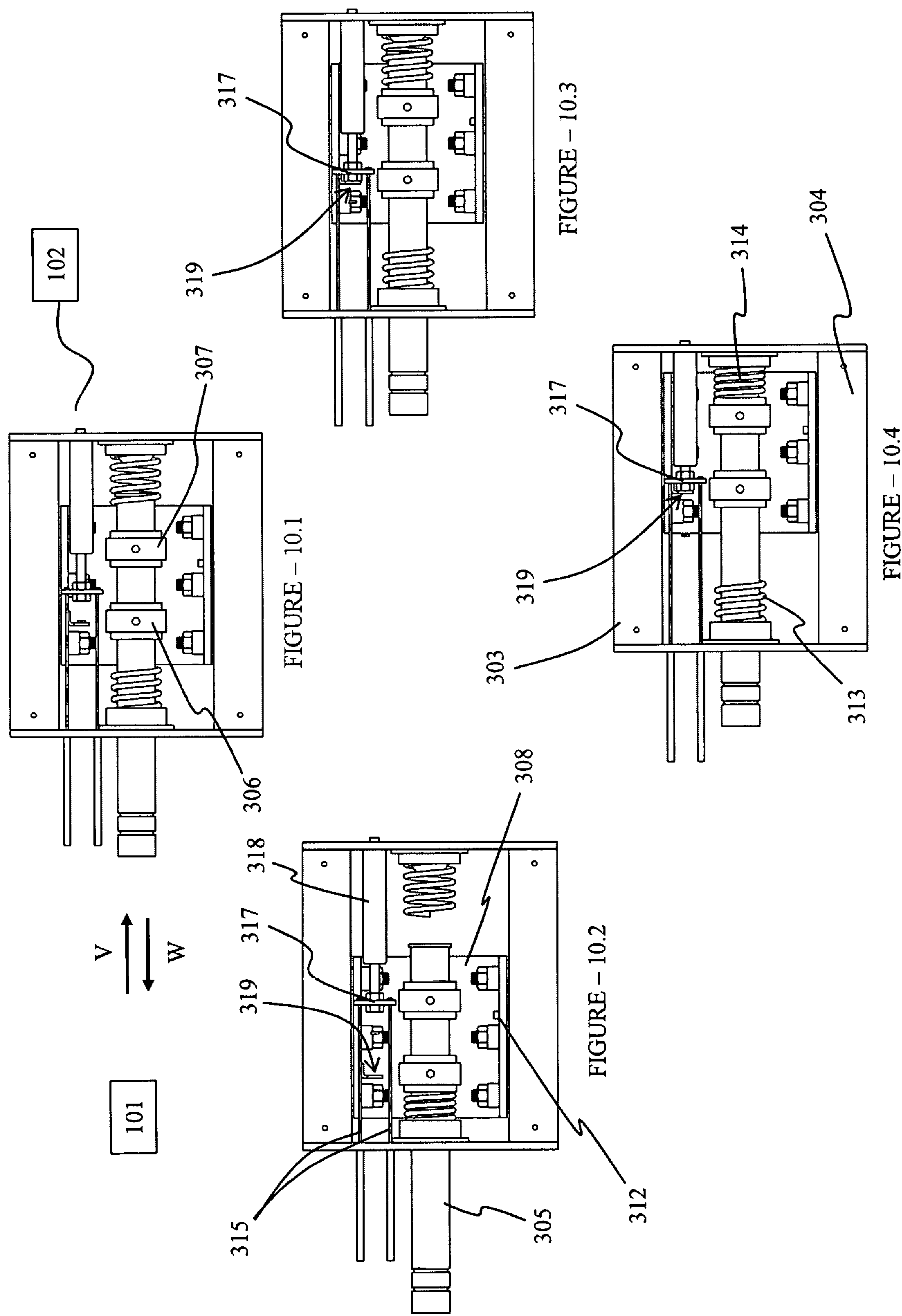

FIG. 10 shows different positions of the sensor unit from FIG. 9. First, a certain distance between the bicycle 101 and trailer 102 is defined as the neutral position. FIG. 10.1 shows the sensor unit in the neutral position.

The acceleration process can be seen in FIG. 10.2. If the bicycle is accelerated, the distance between the bicycle and trailer increases, and the pull rod 305 is drawn out of the housing along the direction W. The distance between the trailer and bicycle is thereby increased at least by the third predetermined distance value. The support body 308 moves together with the pull rod 305 in that the rollers 309, 310 slide along the side elements 303, 304. The rollers 309, 310 are accommodated in the side elements 303, 304 in FIG. 10 and therefore are indiscernible. The sensor element 312 of the linear potentiometer is moved by the support body 308 along the sensor strip 311. The sensor strip 311 is accommodated in the side element 304 in FIG. 10 and therefore is indiscernible. The linear potentiometer transmits an electrical measuring signal corresponding to the deflection to the control unit 106 of the trailer 102. Based on the measuring signal, the control unit 106 correspondingly controls the electric motor 104 via the motor control 120 in order to accelerate the trailer 102. The trailer is basically accelerated until the linear potentiometer again indicates that the neutral position has been reached. In the depiction in FIG. 10.2, the bicycle was accelerated enough for the first anchor piece 306 to come into contact with the spring 313. Like the spring 314, the spring 313 lies outside of the normal range and allows additional mechanical cushioning to reduce impact in the event of strong accelerations/braking procedures.

If the bicycle 101 is braked, the distance between the bicycle 101 and trailer 102 is reduced. The pull rod 305 penetrates further into the housing and moves the support body 308 and hence the sensor element 311 along the direction V. This is shown in FIG. 10.3. The distance between the bicycle and the trailer is accordingly reduced by the predetermined first distance value. The linear potentiometer generates an electrical measuring signal corresponding to the deviation from the neutral position which is transmitted to the control unit 106. This leads to a regenerative braking of the trailer 102 via the electric motor 104 or to a soft, direct braking of the trailer 102 via the brake unit 107.

If the distance between the bicycle and trailer, and hence between the housing and pull rod 305, decreases further, the anchor piece 307 comes into contact with the spring 314 and is accordingly mechanically dampened. In strong braking processes, the pull rod 305 overcomes the spring force of the spring 314. In this case, the driver 319 connected to the support body 308 comes into contact with the connecting piece 317 and thereby pushes the damper rod 320 into the damping element 318. This is shown in FIG. 10.4. This triggers the mechanical braking, i.e., the direct brakes of the brake unit 107 of the trailer are triggered such that braking is hard and direct.

Figure 11:
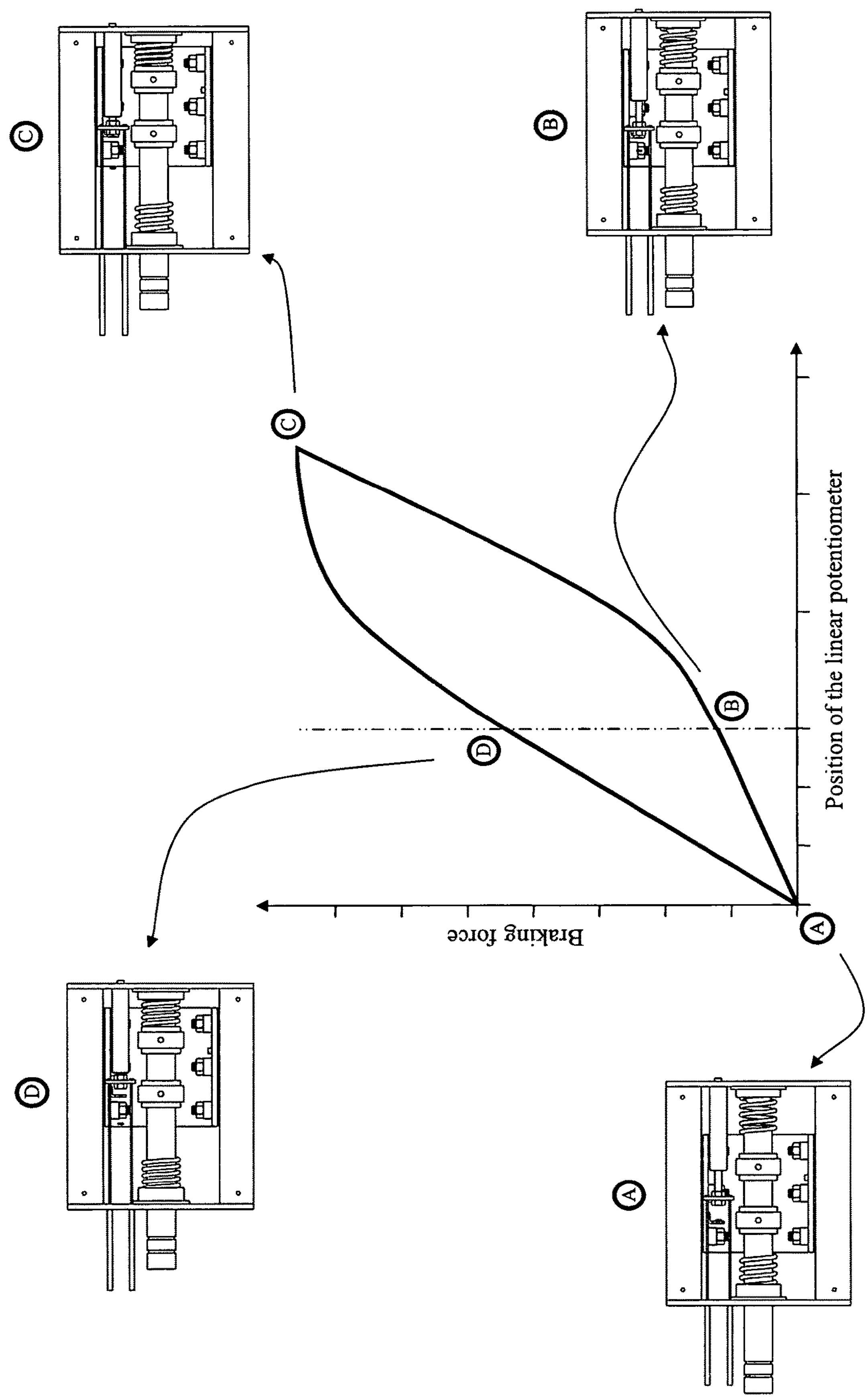

In FIG. 11, the braking process is shown as a hysteresis curve with the sensor unit from FIG. 9. The diagram shows the braking force on the y-axis and the position of the linear potentiometer on the x-axis. Letters a-d indicate different positions of the linear potentiometer. At letter a), the linear potentiometer is in the neutral position. Consequently, the braking force is at zero. If the distance between the bicycle and trailer, and hence between the pull rod and housing, then decreases, the sensor element 312 shifts along the sensor strip 311. The linear potentiometer accordingly measures a deviation in distance which generates a rising braking force as shown at letter b). Within this range, the linear potentiometer outputs the first electrical measuring signal which triggers the regenerative braking and/or the soft, direct braking. The more the distance between the trailer and bicycle decreases, the stronger the regenerative and/or soft, direct braking. If the distance between the trailer and bicycle decreases further, the mechanical brake is actuated as shown at letter c). As explained above, the damper rod 320 is then driven into the damping element 318 by the driver 319, and the direct brakes are triggered hard. In the present example, regenerative braking then stops. The more the distance between the trailer and bicycle decreases, the stronger the hard, direct braking.

Due to the braking process, the distance between the bicycle and trailer again approaches the neutral position. The pull rod again moves out of the housing. In so doing, the driver 319 disengages from the connecting piece 317 since the damper rod 320 only moves slowly out of the damping element 318. Due to the damping element 318, mechanical braking only diminishes gradually, i.e., the hard, direct braking process attenuates in a dampened manner, which is reflected in the hysteresis curve by a slow decrease in braking force as the deflection of the sensor position decreases. If the distance between the bicycle and trailer continues to approach the neutral position, regenerative braking also resumes. This is shown at letter d). Once the damping element 318 again reaches its home position, braking by the control unit is exclusively regenerative and/or soft and direct. The braking process ends once the neutral position is again reached.

Figure 12:
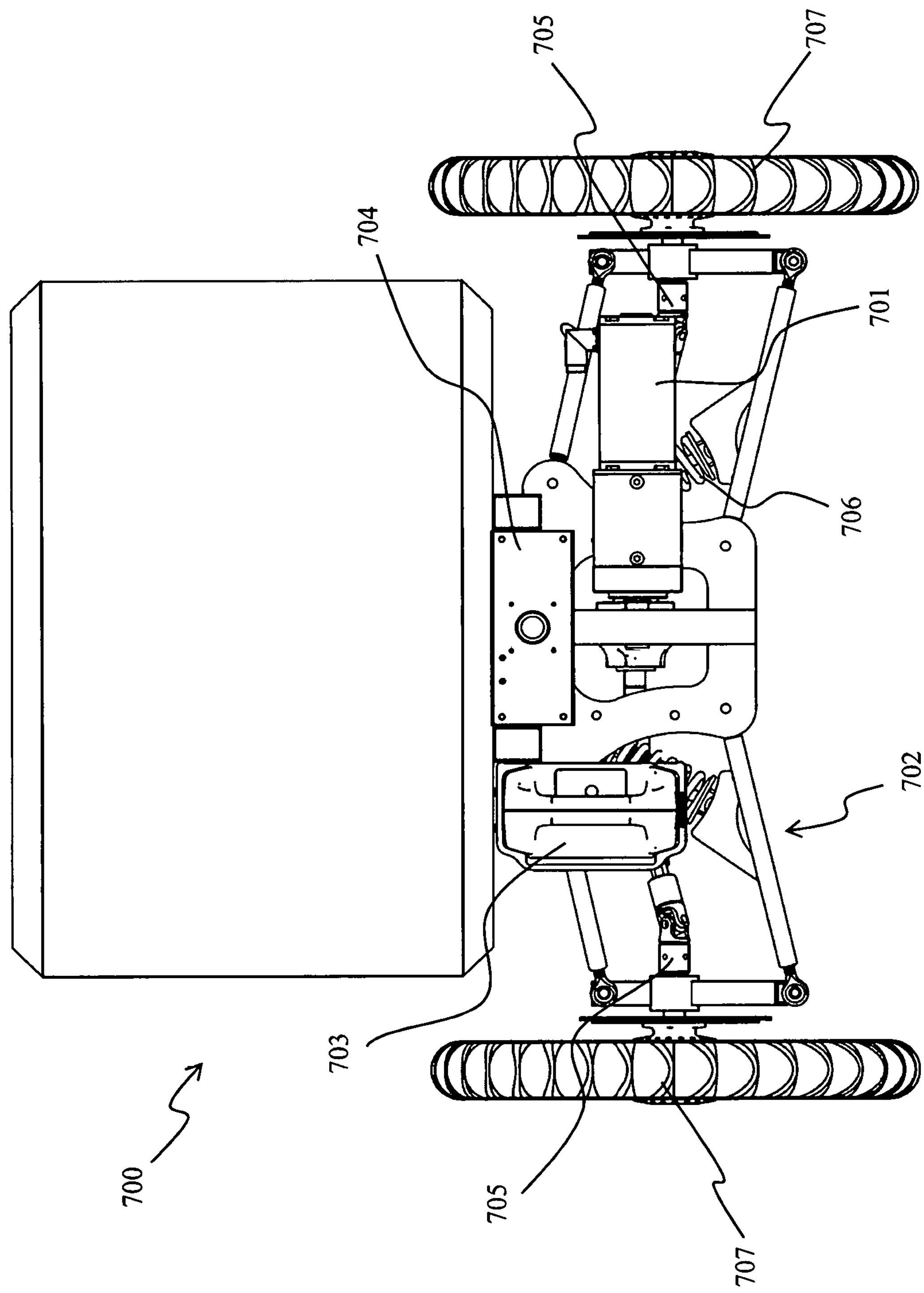
FIG. 12 shows the trailer according to the invention in a second embodiment.

A trailer 700 according to another embodiment can be seen in FIG. 12. The trailer comprises a double wishbone wheel suspension 702 as a double-dampened undercarriage. A sensor unit 704 according to the invention is attached at the front to the trailer 700. An electric motor 701 which drives the trailer 700 is supplied with energy by a battery 703. The electric motor 701 and the battery 703 are mounted on joint axes 705. Each of the wheels 707 is mounted on independent suspensions 706. This trailer allows improved road traction and reduces the influence of disturbance effects that negatively influence the performance of the sensor unit 704. This trailer as well is suitable for the method according to the invention.

REFERENCE SIGN LIST

101 Bicycle
102 Trailer
103 Sensor unit
104 Electric motor
105 Battery
106 Control unit
107 Brake unit
108 Drawbar
109 Connecting part
110 Wheels
111 Trailer axle
113 Grip surfaces
114 Handbrake
120 Motor control
121 Speed sensor
122 Power control
123 Consumer control
124 Rotary encoder
201 Housing
202 Side surface
203 Pull rod
204 Compensating rod
205 Connecting piece
206, 207 Holders
208 Tappet
209 Spiral spring
210 Spring seat
211 Angle sensor
212 Mounting plate
213 Sensor lever
214 Mechanical trigger
215 Trigger rocker
216 Stop
218 Return spring
219 Connecting elements
220 Damping unit
230 Extension
231 Groove
240 Actuator
241 Tie bar
300 Sensor unit
301 Front plate
302 Back plate
303, 304 Side elements
305 Pull rod
306 First anchor piece
307 Second anchor piece
308 Support body
309, 310 Rollers
311 Sensor strip
312 Sensor element
313, 314 Springs
315 Pull cable
316 Cable sleeves
317 Connecting piece
318 Damping unit
319 Driver
320 Damper rod
321 Spring damper
330 Mechanical trigger
700 Trailer
701 Electric motor
702 Double wishbone wheel suspension
703 Battery
704 Sensor unit
705 Joint axes
706 Suspensions
707 Wheels

The invention claimed is:

1. A method for controlling a trailer driven by an electric motor, the method comprising:

defining a distance between the trailer and a towing vehicle as a neutral position;

determining an actual distance between the trailer and the towing vehicle;

determining a deviation between the actual distance and the neutral position;

outputting the deviation as a distance value;

electrically-actuating braking of the trailer when the actual distance between the trailer and the towing vehicle is decreased relative to the neutral position by at least a first distance value;

mechanically-actuating braking of the trailer when the actual distance between the trailer and towing vehicle is decreased relative to the neutral position by at least a second distance value, wherein the second distance value is greater than the first distance value; and accelerating the trailer by the electric motor when the actual distance between the trailer and the towing vehicle is increased relative to the neutral position by a third distance value.

2. The method according to claim 1, wherein the deviation is determined by a sensor unit, and wherein the sensor unit outputs the distance value.

3. The method according to claim 1, a control unit is configured to control the electric motor in response to the distance value.

4. The method according to claim 1, wherein the electrically-actuated braking of the trailer triggers at least one of a regenerative braking and a soft direct braking, and the mechanically-actuated braking of the trailer triggers a hard direct braking, wherein the hard, direct braking exhibits a stronger increase in a braking force than the soft, direct braking.

5. The method according to claim 4, wherein the regenerative braking is achieved by the electric motor, and the soft and hard direct braking are achieved by a direct brake.

6. The method according to claim 1, wherein the electrically-actuated braking is terminated when the actual distance between the trailer and towing vehicle is decreased relative to the neutral position by a fourth distance value, wherein the fourth distance value is less than the first distance value.

7. The method according to claim 6, wherein the mechanically-actuated braking is terminated and the electrically-actuated braking is initiated when the actual distance between the trailer and towing vehicle is decreased relative to the neutral position by a fifth distance value, wherein the fifth distance value is less than the second distance value but greater than the fourth distance value.

8. The method according to claim 1, wherein the acceleration of the trailer by the electric motor is terminated when the actual distance between the trailer and towing vehicle is increased relative to the neutral position by a sixth distance value, wherein the sixth distance value is less than the third distance value.

9. The method according to claim 1, wherein the neutral position is defined as the trailer lagging behind the towing vehicle without forming a load.

10. The method according to claim 1, wherein the neutral position is defined as the trailer pushing the towing vehicle.

11. A motor-driven trailer comprising:

at least one wheel;

an electric motor configured to drive the at least one wheel;

at least one storage unit configured to supply energy to the electric motor;

a drawbar configured to connect the motor-driven trailer to a towing vehicle;

a sensor unit positioned on the drawbar and configured to measure a deviation in distance from a neutral position that arise between the towing vehicle and trailer, the sensor unit further configured to generate an electrical measuring signal that corresponds to the deviation in distance;

a control unit configured to brake the trailer based on the electrical measuring signal received from the sensor unit when the distance between the trailer and towing vehicle is reduced relative to the neutral position by at least one first distance value, and further configured to control the electric motor based on the electric measuring signal received from the sensor unit in order to accelerate the trailer when the distance between the trailer and towing vehicle is increased relative to the neutral position by a third distance value; and a mechanical trigger configured to brake the trailer based when the distance between the trailer and towing vehicle is reduced relative the neutral position by at least one second distance value, wherein second distance value is greater than the first distance value.

12. The trailer according to claim 11, wherein the control unit is further configured to initiate one of regenerative braking and direct soft braking of the trailer in response to the electrical measuring signal, and wherein the mechanical trigger is configured to initiate direct hard braking of the trailer in response to the deviation in distance.

13. The trailer according to claim 12, wherein the direct hard braking exhibits a stronger rise in braking force than the direct soft braking.

14. The trailer according to claim 12, wherein the regenerative braking is achieved by the electric motor and the direct soft and direct hard braking are achieved by a brake unit with a direct brake.

15. The trailer according to claim 11, wherein the storage unit is an electrical battery.

16. The trailer according to claim 11, further comprising a speed sensor that is connected at least to the electric motor and the control unit.

17. The trailer according to claim 11, wherein the sensor unit comprises:

a housing;

a pull rod extending out of the housing and configured to connect to the drawbar, wherein the pull rod is mounted so as to be shiftable relative to the housing; and a distance sensor configured to determine a relative position between the housing and pull rod, wherein the pull rod is shiftably held within a normal range without a mechanical restoring force, and wherein the normal range extends beyond the first and third distance value.

18. The trailer according to claim 17, wherein the sensor unit further comprises:

a plurality of rollers connected to the pull rod; and a plurality of guide elements formed as part of the housing and configured to accommodate the plurality of rollers, wherein the pull rod is movably mounted on the plurality of rollers.

19. The trailer according to claim 11, wherein the mechanical trigger further comprises a damping unit comprising a damper rod and a driver that is connected to a pull rod, wherein the driver is configured to drive the damper rod into the damping unit via a movement of the pull rod in order to initiate braking.

* * * * *